United States Patent [19]

Schultz

[11] Patent Number: 5,206,054
[45] Date of Patent: * Apr. 27, 1993

[54] APPARATUS AND METHOD FOR APPLYING A COATING TO A CAN BODY

[75] Inventor: Robert H. Schultz, Golden, Colo.

[73] Assignee: Coors Brewing Company, Golden, Colo.

[*] Notice: The portion of the term of this patent subsequent to Jun. 11, 2008 has been disclaimed.

[21] Appl. No.: 649,414

[22] Filed: Feb. 1, 1991

Related U.S. Application Data

[63] Continuation-in-part of Ser. No. 336,104, Apr. 11, 1989, Pat. No. 5,023,112.

[51] Int. Cl.$^5$ .................. B05D 5/08; B05D 1/28; B05C 1/02; B05C 13/02
[52] U.S. Cl. .................. 427/287; 427/429; 118/50; 118/211; 118/230; 118/232; 118/264; 118/DIG. 3
[58] Field of Search .................. 427/287, 428, 429; 118/211, 218, 230, 232, 266, 267, DIG. 3, 264, 50

[56] References Cited

U.S. PATENT DOCUMENTS 4,092,447 5/1978 Frederick et al. .................. 427/286
4,308,818 1/1982 Abe et al. .................. 118/211

OTHER PUBLICATIONS

Schultz, application Ser. No. 07/336,104, filed Apr. 11, 1988.

*Primary Examiner*—Evan Lawrence
*Attorney, Agent, or Firm*—Klaas, Law, O'Meara & Malkin

[57] ABSTRACT

Apparatus and method for applying a coating, such as a lubricant, on at least a portion of the outer peripheral surface of a can body wherein a turret having a plurality of pockets formed in its outer peripheral surface is mounted for rotation about a relatively fixed axis and during the rotation thereof a can body is fed into each pocket. The can body in each pocket is held against the outer peripheral surfaces of a pair of rotating rolls having a space therebetween by a vacuum acting through the space so that the can body is rotated thereby and while rotating is moved against a heated arcuate wick located in a heated arcuate support and having a supply of lubricant therein so as to form a coating of lubricant on the at least a portion of the outer peripheral surface. The peripheral velocity of the outer peripheral surface of the rotating can body about its own axis is the same as its peripheral velocity imparted thereto by the rotation of the turret about its own axis and is rotating in a direction opposite to the direction of rotation of the turret so that there is substantially no relative sliding movement between the at least a portion of the outer peripheral surface and the arcuate wick as the coating of lubricant is applied.

20 Claims, 6 Drawing Sheets

5,206,054

APPARATUS AND METHOD FOR APPLYING A COATING TO A CAN BODY

This application is a Continuation-In-Part Application of U.S. patent application Ser. No. 336,104 filed Apr. 11, 1989, now U.S. Pat. No. 5,023,112.

FIELD OF THE INVENTION

This invention relates generally to the manufacture of one piece aluminum can bodies and more specifically to that portion of the manufacturing operations wherein a coating of lubricant is applied to at least a portion of the outer peripheral surface of the can body.

BACKGROUND OF THE INVENTION

During the manufacture of one piece aluminum can bodies, a coating of lubricant is applied to the portion of the outer peripheral surface of the can body next adjacent to the open end thereof. In the prior art applicators, the can bodies are driven across a wick or a roll using moving belts in contact with the side walls of the can bodies to rotate them. While this method has proven to be effective in applying the coating of lubricant, there are many instances wherein the belts damage the can bodies. Also, it is difficult to maintain a constant relationship between the rotating can body and the applicator so that an uneven layer of the coating of lubricant is often applied. If a can body is not properly located when it is contacted by the belts, it is possible for the can body to be tilted and hung up thus causing the can body to cause a jam-up of the flow of can bodies. Therefore, there existed a need for a system for applying a coating of lubricant to the outer peripheral surface of a can body that is able to precisely position the can body against the lubricant applying means and to handle the can body so that the least amount of deleterious forces are applied thereto.

BRIEF DESCRIPTION OF THE INVENTION

This invention provides apparatus and method for applying a coating, such as a lubricant, to at least a portion of the outer peripheral surface of a can body using a rotating turret having a plurality of pockets on its outer peripheral surface with a can body held and rotated in each pocket so that when the can body moves into contact with an arcuate wick having a supply of lubricant therein, an even coating of lubricant is applied to at least a portion of the outer peripheral surface of the can body.

In the preferred embodiment of the invention, a main drive shaft is rotatable mounted on a fixedly mounted support frame and is rotated by suitable means such as a drive motor. A turret is mounted on the main drive shaft for rotation therewith and a plurality of pockets are provided on the outer peripheral portion of the turret. Feed means are fixedly mounted on the support frame and provide a continuous supply of can bodies so that, as the turret rotates, one portion of each pocket removes the bottommost can body from the feed means as it passes thereby. Each of the pockets has a pair of rolls which are rotatably mounted on the turret for rotation relative thereto and have axes of rotation which are in parallel relationship. Each of the rolls has a generally cylindrical outer peripheral surface with oppositely facing portions of adjacent rolls spaced a small distance apart. Vacuum means are provided for supplying a vacuum between the oppositely facing portions of the pairs of rolls so as to hold the can body in the pocket against the generally cylindrical outer peripheral surfaces of the pair of rolls to establish line contact therebetween. While vacuum means are preferred for holding the can body in the pocket, other types of holding means may be employed, such as magnets for iron containing can bodies. A stationary gear is mounted at a fixed location. A gear is fixedly mounted on each of the rolls and is located so as to be in mesh with the stationary gear so that rotation of the turret rotates the rolls and therefore the can body supported thereon. A coating applying means, which in the preferred embodiment is a lubricant, is adjustably mounted on the support frame and comprises an arcuate wick which is located so as to be contacted by at least a portion of the outer peripheral surface of the can body as the turret rotates. Lubricant feeding means are provided for supplying lubricant to the arcuate wick. Heating means are provided for heating the arcuate wick to ensure free flowing of the lubricant. This also permits the use of a semi-solid or gel type lubricant, such as petroleum jelly. Each can body is rotated about its own axis so that the peripheral velocity of the outer peripheral surface of each can body is the same as its peripheral velocity due to the rotation of the turret about its own axis and is rotating in a direction opposite to the direction of rotation of the turret so that there is substantially no relative sliding movement between the outer peripheral surface of the can body and the arcuate wick as the coating of lubricant is applied to the can body. The at least a portion of the outer peripheral surface is in contact with the arcuate wick for at least one complete revolution of the can body.

BRIEF DESCRIPTION OF THE DRAWINGS

An illustrative and presently preferred embodiment of the invention is shown in the accompanying drawings in which.

DETAILED DESCRIPTION OF THE INVENTION

Figure 2:
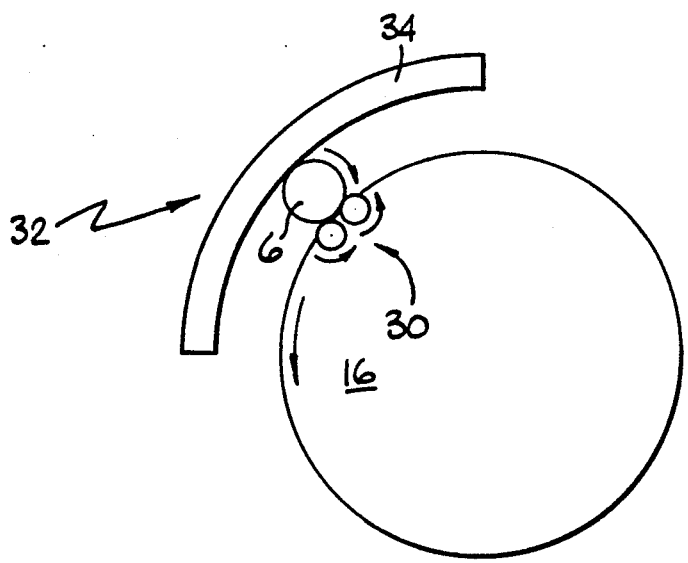
FIG. 2 is a schematic illustration of the operation of the invention.
Figure 3:
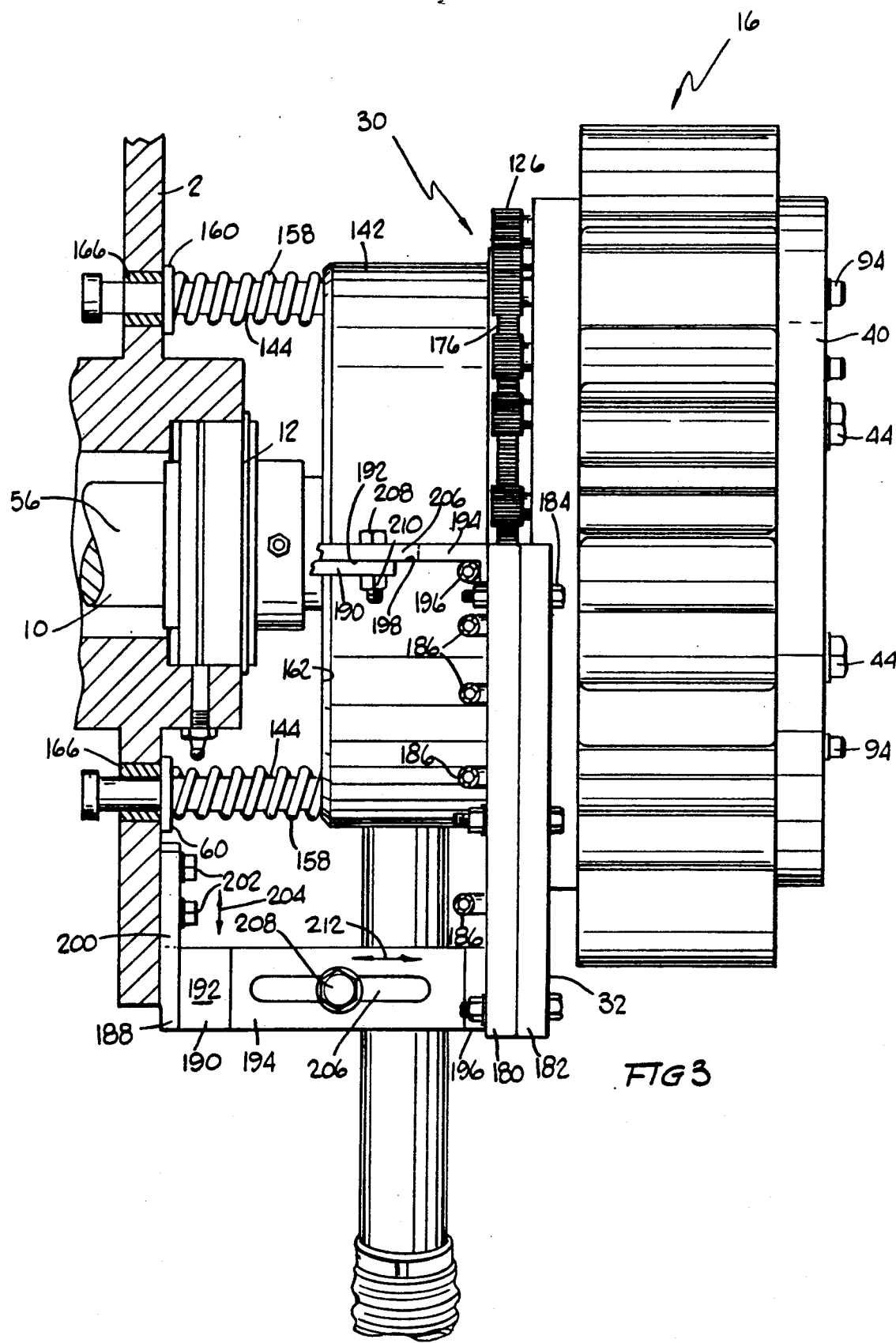
FIG. 3 is a top plan view of a portion of FIG. 1.
Figure 4:
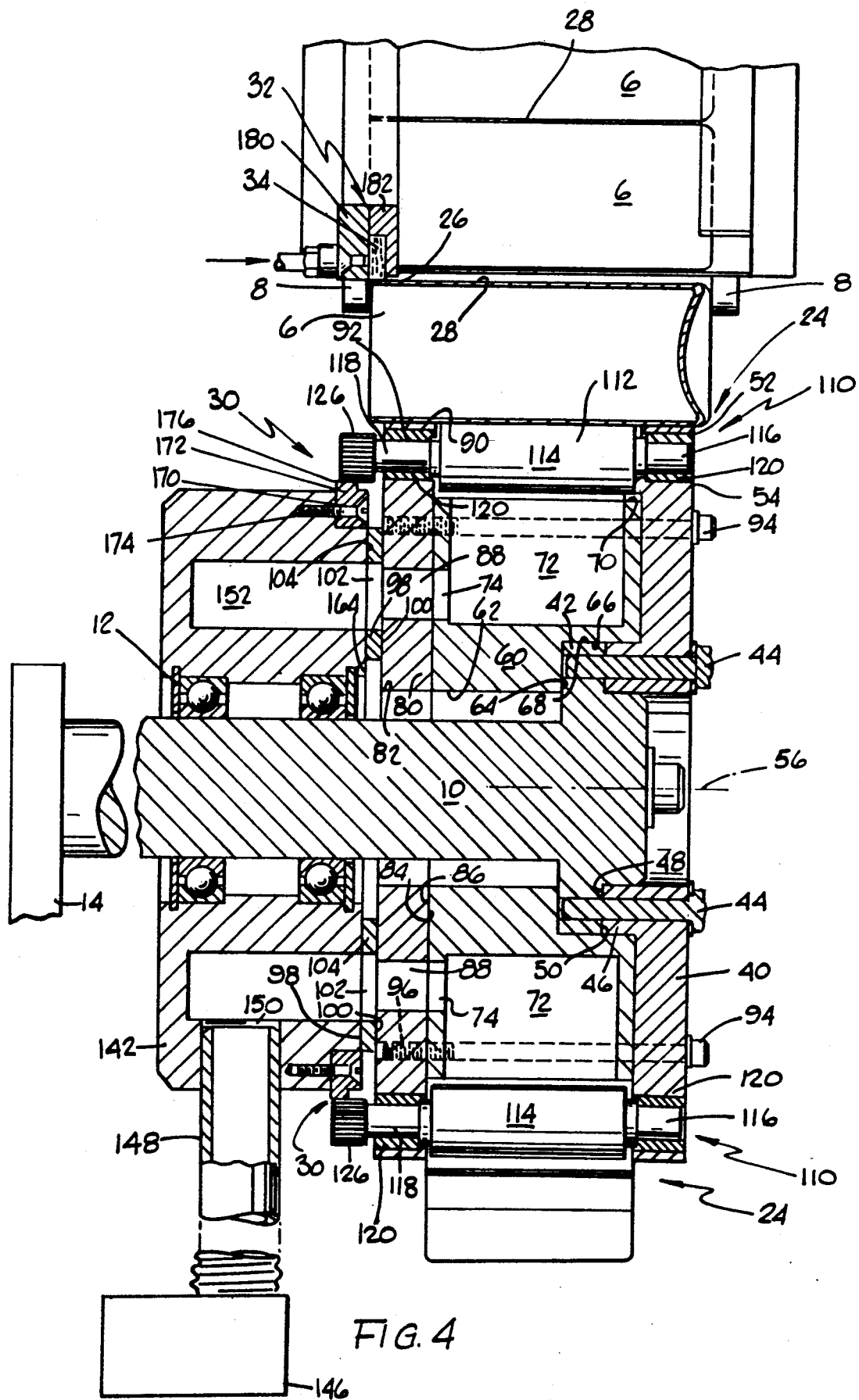
FIG. 4 is a side elevational view of FIG. 1 with parts in section.

The preferred embodiment of the invention is illustrated in FIGS. 1-5 and comprises a fixedly mounted support frame 2 on which is mounted can body feeding means 4 for holding a plurality of can bodies 6, FIG. 4, and having guide arms 8 for guiding the movement of a can body 6 as it is removed from the can body feeding means 4 as described below. A main drive shaft 10 is mounted for rotation in a bearing 12, FIGS. 3 and 4, mounted on the support frame 2 and is rotated by conventional drive means, such as a motor 14. A turret 16 is mounted on the main drive shaft 10 for rotation therewith and has a plurality of pockets 18, FIGS. 1 and 5, each of which has a radially outwardly projecting member 20 having an arcuate surface 22 and is located so that, as the turret 16 rotates, the member 20 removes a can body 6 as it moves through the can body feeding means 4. Can body holding means 24 are provided for each pocket 18 and function to hold a can body 6 in a pocket 18 so that at least a portion 26, FIG. 4, of the outer peripheral surface 28 of the can body 6 is freely exposed. Can body rotating means 30 are provided for rotating the can bodies 6 as the turret 16 rotates. Arcuately shaped coating applying means 32, which in the preferred embodiment is a lubricant and which is described more fully below, are adjustably mounted on the support frame 2 and have an arcuately shaped wick 34, FIGS. 2 and 4, saturated with liquid lubricant and located so as to be contacted by the at least a portion 26 of the outer peripheral surface 28 of a can body 6 as the turret 16 rotates. The operation of the invention is illustrated schematically in FIG. 2 wherein the can body rotating means 30 rotates each can body 6 about its own axis so that the peripheral velocity of the at least a portion 26 of the outer peripheral surface 28 is substantially the same as its peripheral velocity imparted thereto by the rotation of the turret 16 about its own axis and is moving in a clockwise direction as compared to the movement of the turret 16 in a counter-clockwise direction, as indicated by the various arrows in FIG. 2, so that there is substantially no relative sliding movement between the at least a portion 26 of the outer peripheral surface 28 and the arcuately shaped wick 34 as the coating of lubricant is being applied. The arcuately shaped wick 34 has an arcuate extent which cooperates with the velocities of the turret 16 and the can body 6 to ensure that the can body 6 has at least one complete revolution while the at least a portion 26 of the outer peripheral surface 28 is in contact with the arcuately shaped wick 34.

Figure 5:
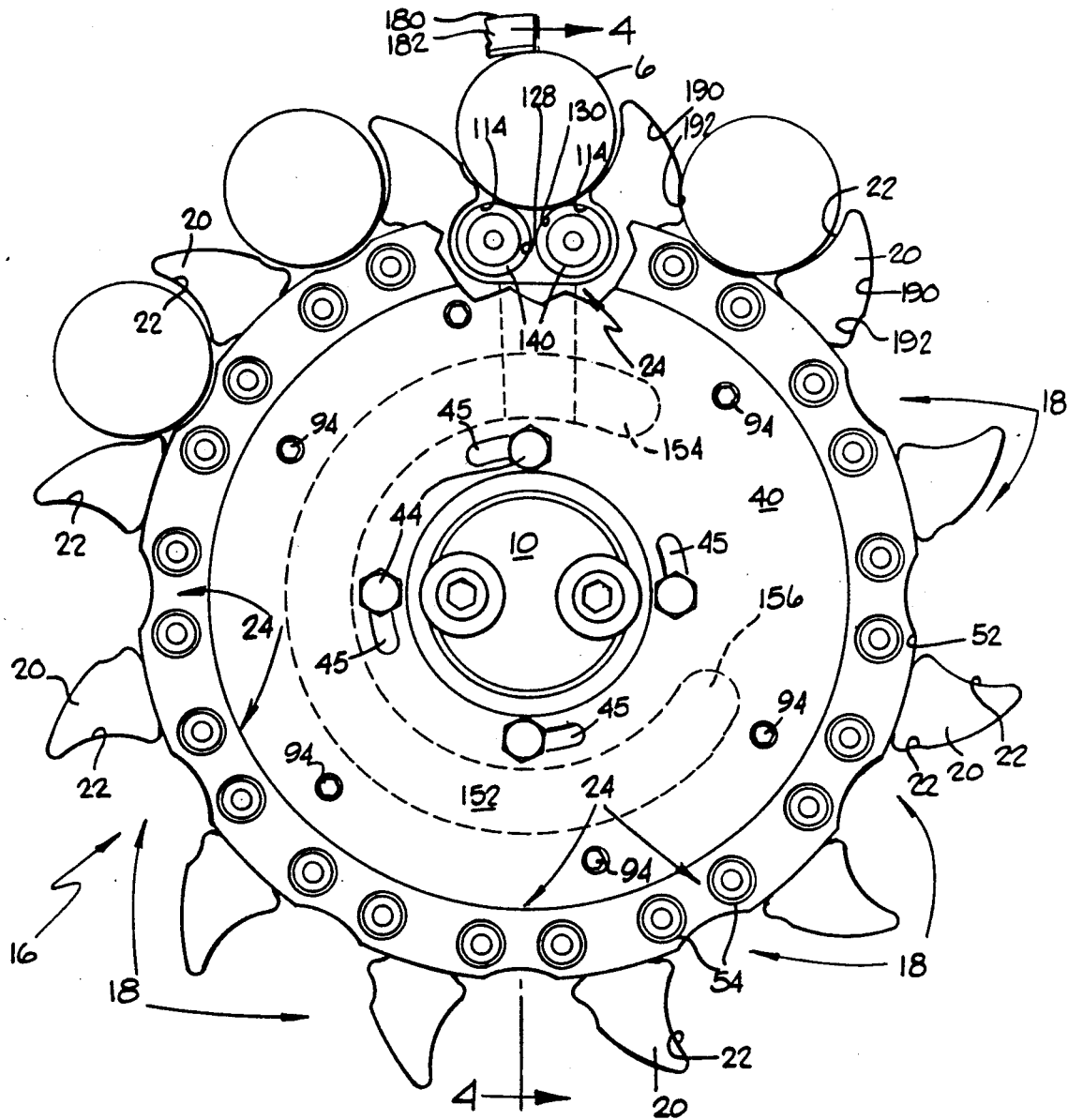
FIG. 5 is a front elevational view of a portion of FIG. 1.

The turret 16 comprises an axially outer annular member 40, FIGS. 3 and 4, which is mounted on a flange portion 42 integral with the main drive shaft 10 by headed threaded bolts 44 passing through arcuately shaped slots 45 to provide for adjustment thereof. The axially outer annular member 40 has an axially inwardly projecting annular flange 46 having a generally planar surface 48 in contact with a generally planar surface 50 of the flange portion 42. The axially outer annular member 40 has a generally cylindrical outer peripheral surface 52, FIG. 4, and a plurality of openings 54 extending therethrough in an axial direction parallel to the axis of rotation 56 of the main drive shaft 10 wherein pairs of the openings 54, FIG. 5, are spaced equidistantly apart and are located the same distance radially inwardly from the outer peripheral surface 52.

An annular central body portion 60 has a generally cylindrical inner surface 62 through which the main drive shaft 10 passes and a radially outwardly extending recess 64 having a generally cylindrical surface 66 in contact with the generally cylindrical outer surface 68 of the flange portion 42. The annular central body portion 60 has a generally cylindrical outer peripheral surface 70 having a diameter substantially less than the diameter of the generally cylindrical outer peripheral surface 52. A plurality of circumferentially spaced apart compartments 72 extend radially inwardly from the outer peripheral surface 70 and each compartment 72 has an opening 74 extending therethrough in an axial direction generally parallel to the axis of rotation 56 of the main drive shaft 10.

An axially inner annular member 80 has a generally cylindrical inner surface 82 through which the main drive shaft 10 passes and has a generally planar surface 84 in contact with a generally planar surface 86 of the annular central body portion 60. A plurality of equidistantly spaced apart openings 88 extend through the axially inner annular member 80 in an axial direction generally parallel to the axis of rotation 56 of the main drive shaft 10 are in alignment with the openings 74 in the annular central body portion 60. The axially inner annular member 80 has a generally cylindrical outer peripheral surface 90 and a plurality of openings 92 extending therethrough in an axial direction generally parallel to the axis of rotation 56 of the main draft shaft 10 wherein pairs of the openings 92 are spaced equidistantly apart and are located the same distance radially inwardly from the outer peripheral surface 90 similar to the pairs of openings 52. A plurality of headed threaded bolts 94 extend through openings in the axially outer annular member 40, the annular central body portion 60 and are threaded into threaded openings 96 in the axially inner annular member 80 to secure the annular central body portion 60 and the axially inner annular member 80 to the axially outer annular member 40 for rotation therewith. An annular wear plate 98 is secured on the generally planar surface 100 of the axially inner annular member 80. The annular wear plate 98 has a plurality of equidistantly spaced apart openings 102 extending therethrough in an axial direction generally parallel to the axis of rotation 56 of the main drive shaft 10 and each opening 102 is aligned with the openings 74 and 88 and has a generally planar annular surface 104 for purposes described below.

A roll 110 has a central body portion 112 having a generally cylindrical outer peripheral surface 114 having a diameter slightly greater than the diameter of the generally cylindrical inner surface of the openings 52 and 92 has end portions 116 and 118 which are mounted in bearings 120 secured in the openings 52 and 92. A gear 126 is mounted on the end portion 118 so that rotation of the gear 126, as described below, rotates the roll 110. As illustrated in FIG. 5, the generally cylindrical outer peripheral surfaces 114 have oppositely facing portions 128 and 130 slightly spaced apart for purposes described below. Each of the pockets 18 has a pair 140 of the shafts 110 and the radially outwardly projecting members 20 the arcuate surfaces 22 for guiding the can bodies onto the generally cylindrical outer peripheral surfaces 114.

Manifold means 142, FIGS. 2 and 3, are resiliently movably mounted by rods 144 on the support frame 2 and are connected to a vacuum producing means 146 by flexible tubing 148 connected to an opening 150 in the manifold means 142. An arcuately shaped recess 152, FIGS. 4 and 5, has one end portion 154 associated with the can body feeding means 4 and the other end portion 156 at a can body discharge station. The centerline of the arcuately shaped recess 152 is in alignment with the centers of the openings 74, 88 and 102. A spring 158 is mounted on each of the rods 144 and bears against a flange 160 on the support frame 2 and the outer surface 162 of the manifold means 142 to urge the generally planar surface 164 against the generally planar surface 104 of the annular wear plate 98. The rods 144 are slidably mounted in bushings 166 secured in the support frame 2. The foregoing structure functions to provide a vacuum between the oppositely facing portions 128 and 130 when the aligned openings 74, 88 and 102 are opposite the arcuate recess 152 during the rotation of the turret 16 so as to hold a can body 6 against the generally cylindrical outer peripheral surfaces 114 of the rolls 110.

As illustrated in FIG. 4, a recess 170 facing the turret 16 is formed in the manifold means 142. A stationary gear 172 is mounted in the recess 170 by bolts 174 and has a plurality of teeth 176 located so as to be in engagement with the teeth of the gears 126 so that rotation of the turret 16 rotates the gears 126 and therefore the rolls 110 so as to rotate the can body 6 in contact with the generally cylindrical outer peripheral surfaces 114.

Figure 1:
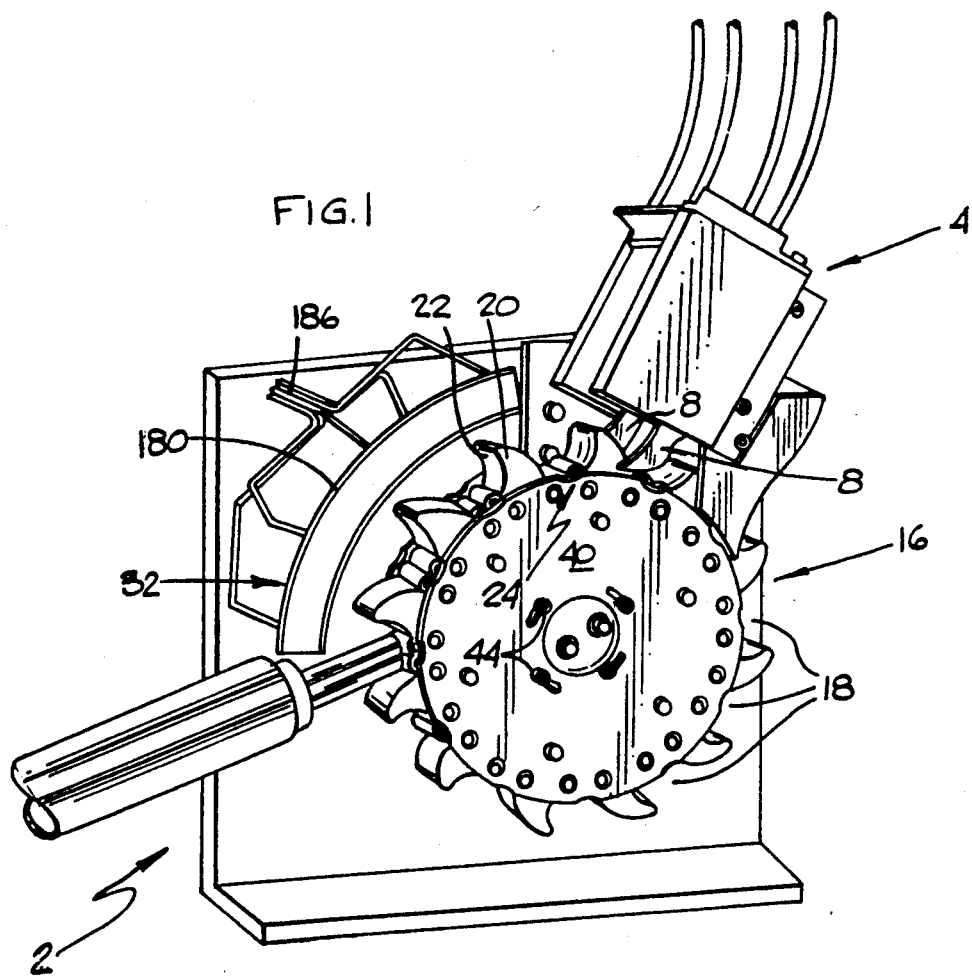
FIG. 1 is a perspective view of the preferred embodiment of the invention.

The arcuately shaped coating applying means 32, FIG. 4, comprises an arcuately shaped support 180 having an inverted U-shaped transverse cross-sectional configuration formed by a cover plate 182 secured thereto by a plurality of threaded nuts and bolts 184. The arcuately shaped wick 34 is secured between the arcuately shaped support 180 and the cover plate 182 and a plurality of hoses 186, FIG. 1, are connected through the arcuately shaped support 180 to the arcuately shaped wick 34 to supply a liquid lubricant thereto. The arcuately shaped wick 34 is preferably formed from a lubricant holding material such as an open cell polyurethane foam. As illustrated in FIG. 3, the arcuately shaped support 180 is adjustably mounted on the support frame 2 by a pair of spaced apart plate members 188 secured to the support frame 2 and each having an extension arm 190 extending outwardly therefrom in the direction of the turret 16 and having a generally planar surface 192. Another pair of spaced apart plate members 194 having flange portions 196 which are mounted on the arcuately shaped support 180 by suitable means, such as bolts (not shown). Each plate member 194 has a generally planar surface 198 in sliding contact with the generally planar surface 192. Each plate member 188 has a slot 200 formed therein which cooperates with headed bolts 202 for adjustment of the arcuately shaped support 180 in linear directions as indicated by the arrow 204. Each plate member 194 has a slot 206 formed therein which cooperates with headed bolts 208 and nuts 210 for adjustment of the arcuately shaped support 180 in linear directions as indicated by the arrow 212.

In operation, can bodies 6 are continuously supplied to the can body feeding means 4. As the turret 16 rotates, the radially outwardly projecting member 20 contacts the bottommost can body 6 in the can body feeding means 4 to remove such can body 6. The arcuately shaped surface 22 guides the can body 6 onto the generally cylindrical outer surfaces 114. The trailing side 190 is also provided with an arcuate surface 192 to ensure that the can body 6 is seated on the cylindrical outer surfaces 114. When the can body 6 is seated on the cylindrical outer surfaces 114, it does not contact either of the arcuate surfaces 22 and 192. As illustrated in FIG. 5, as the can body 6 is positioned on the generally cylindrical outer surfaces 114, the turret 16 has rotated so that the compartment 72 therebeneath has been connected to the vacuum source 146 through the recess 152 so that a vacuum in the compartment 72 holds the can body 6 in contact with the generally cylindrical outer peripheral surfaces 114. The guide arms 8 guide the can body 6 into the proper position on the generally cylindrical outer peripheral surfaces 114 so that the at least a portion 26 thereof will be properly oriented so as to contact the arcuate wick 34. As described above, and as illustrated in FIG. 2, the can body 6 is rotated so that its peripheral velocity is equal to the peripheral velocity of the turret 16 so that there is no relative sliding motion between the portion 26 of the can body 6 and the corresponding portion of the arcuate wick 34 that it is rolled over. As illustrated in FIG. 5, when the turret 16 has rotated the compartment 72 past the vacuum cut off 156, the can body 6 may be removed from the pocket 18 by suitable means (not shown) for further processing. The lubricant applied to the can body may be varied according to the further processing operations and may comprise such materials as a mineral oil, a melted petrolatum or other liquid materials.

Figure 6:
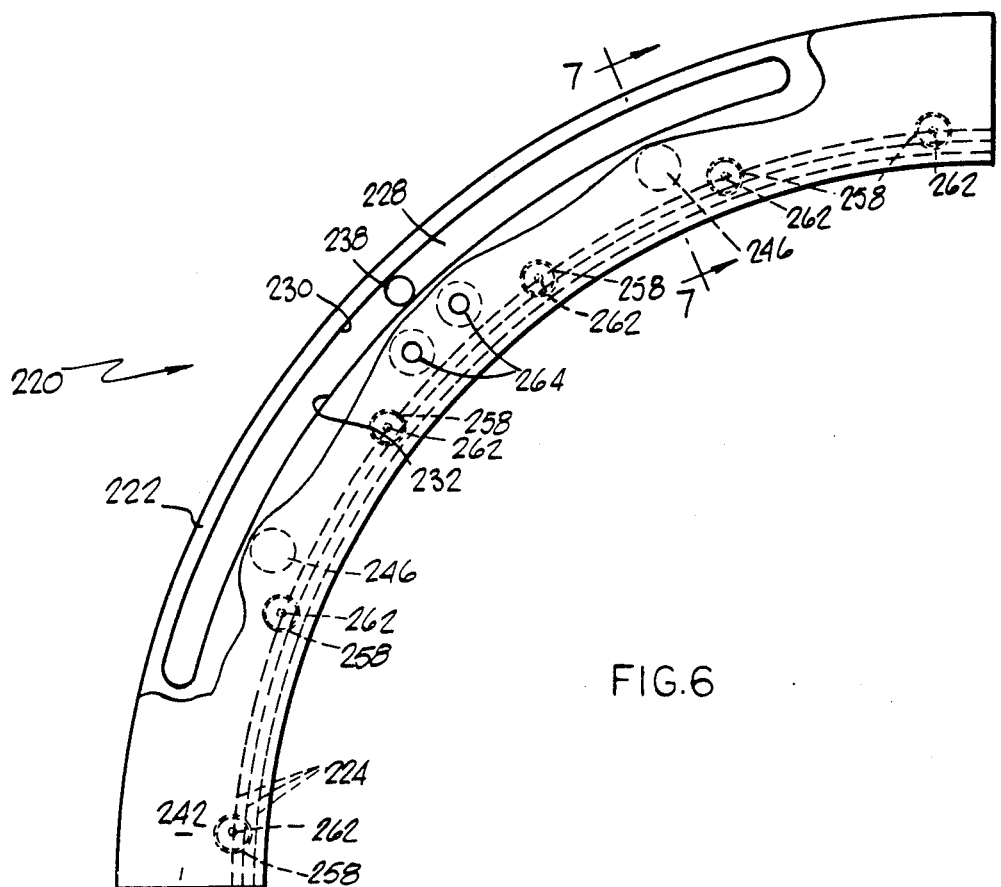
FIG. 6 is a front elevational view of another preferred embodiment of the lubricant applying means with parts removed.
Figure 7:
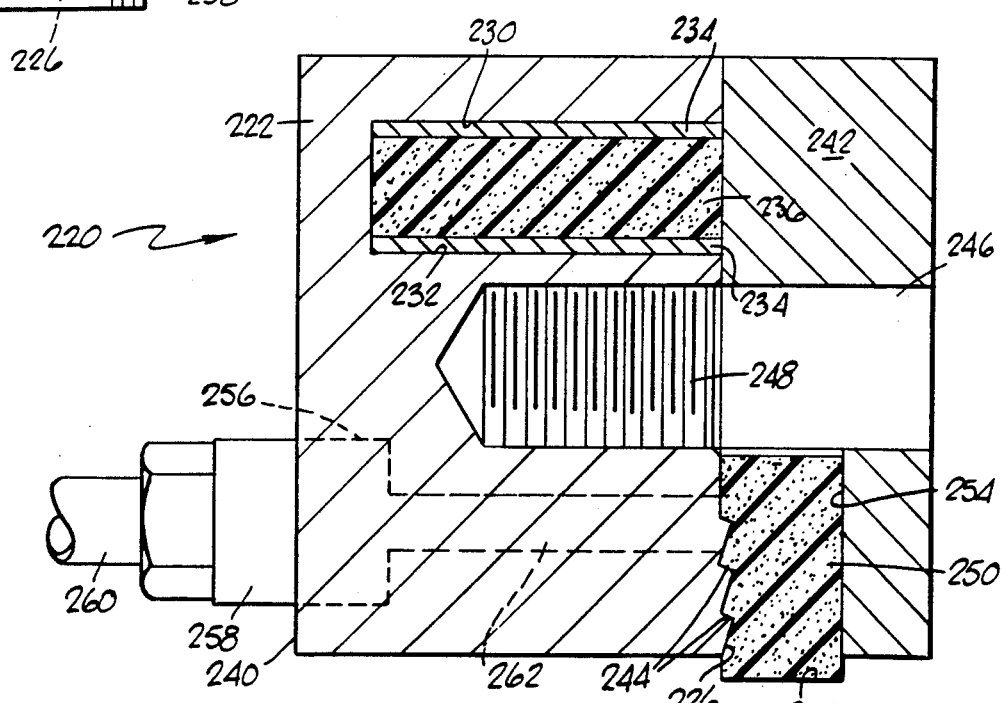
FIG. 7 is a cross-sectional view taken on the line 7-7 of FIG. 6.
Figure 8:
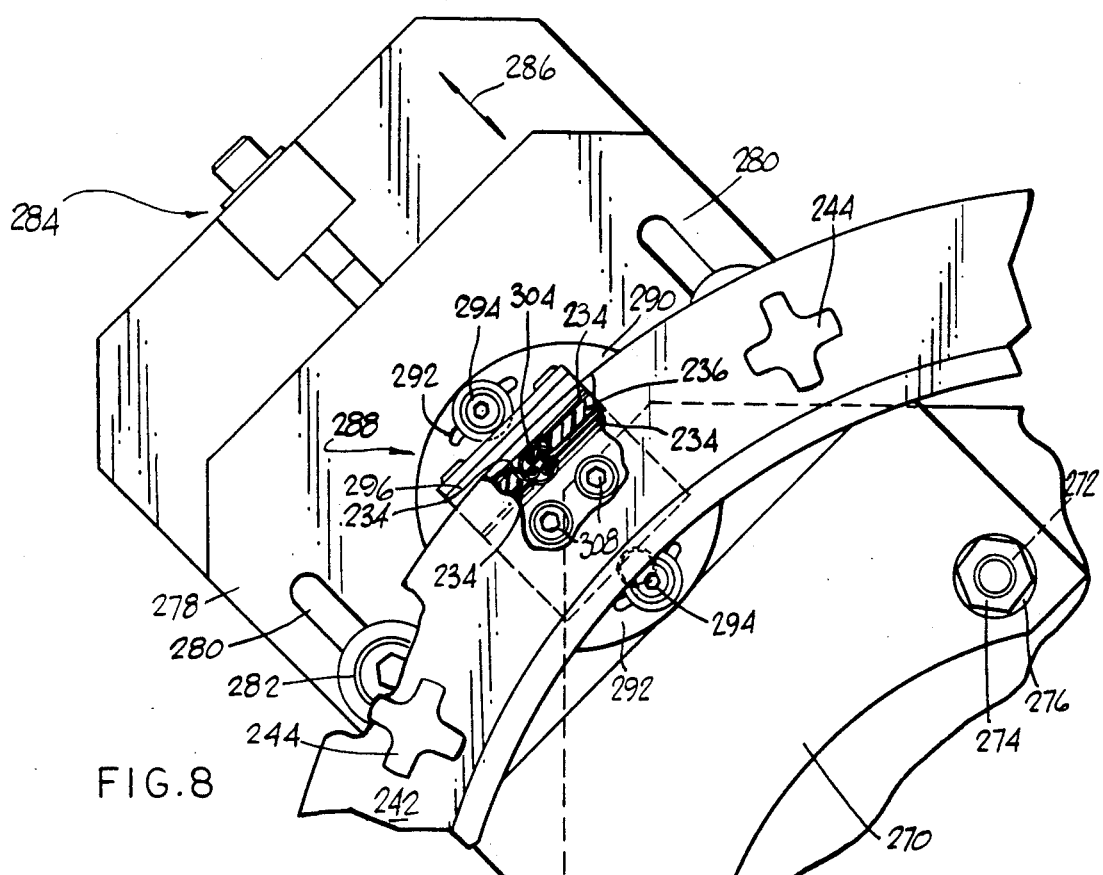
FIG. 8 is a front elevational view of the mounting means for the lubricant applying means.
Figure 9:
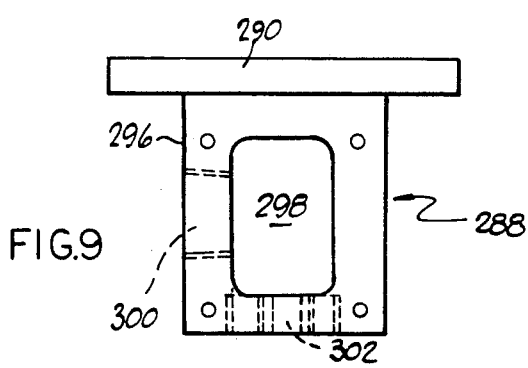
FIG. 9 is a top plan view of a portion of FIG. 8.
Figure 10:
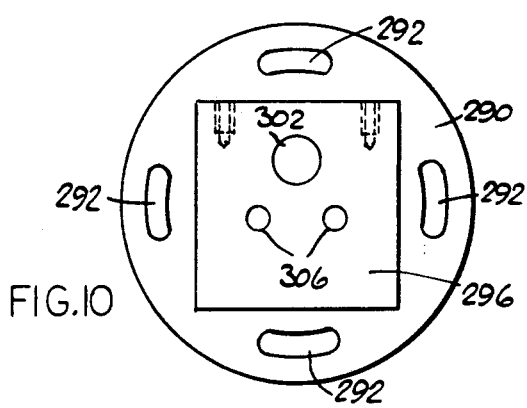
FIG. 10 is a front elevational view of FIG. 9.
Figure 11:
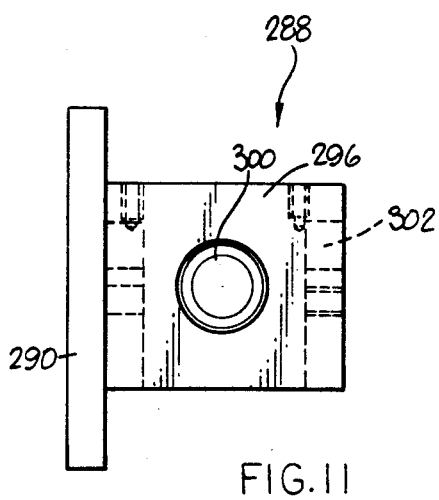
FIG. 11 is a side elevational view of FIG. 9.

Another preferred embodiment of the invention is illustrated in FIGS. 6-11 wherein an arcuately shaped coating applying means 220 is illustrated in FIGS. 6 and 7 and comprises an arcuately shaped support 222 having a plurality of arcuately shaped serrations 224 formed in one surface 226 thereof for purposes described below. An arcuately shaped recess 228 is formed in the one surface 226 and has a radially outer surface 230 and a radially inner surface 232. A plurality of heating elements 234, such as a thermofoil heater marketed by Minco under the trade designation HK 6030-05 A 34.2, are held in spaced apart relationship in the arcuately shaped recess 228 by a silicone sponge rubber pad 236 (closed cell) so that each heating element 234 is in contacting relationship with either the radially outer wall 230 or the radially inner wall 232. In the preferred embodiment of the invention, there are four heating elements 234 with two heating elements 234 being on one side of an opening 238 extending through the surface 240 of the arcuately shaped support 222 and into the arcuately shaped recess 228 and two heating elements 234 on the other side of the opening 238. An arcuately shaped cover plate 242 is provided and is secured to the arcuately shaped support 222 by hand knobs 244, FIG. 8, having an externally threaded stem portion (not shown) passing through openings 246 in the arcuately shaped cover plate 242 and in threaded engagement with internally threaded openings 248 in the arcuately shaped support 222. An arcuately shaped wick 250 having an arcuate surface 252 is located in a recess 254 in the arcuately shaped cover plate 242 and when the hand knobs 244 are tightened, the arcuately shaped cover plate 242 presses the arcuately shaped wick 250 against the serrations 224 to hold it in place. The arcuately shaped wick 34 is preferably formed from a lubricant holding material, such as an open cell polyurethane foam. The arcuately shaped cover plate 242 also holds the heating elements 234 and the sponge rubber pads 236 in the arcuately shaped recess 228. A plurality of internally threaded openings 256 are provided in the arcuately shaped support 222 to receive externally threaded fittings 258 on the hoses 260 for feeding a lubricating material through passageways 262 to the arcuately shaped wick 250. Two countersunk bores 264 are formed in the arcuately shaped support for purposes described below.

In FIGS. 8-11, there is illustrated mounting means for adjustably mounting the coating applying means 220 on the support frame 2. A base plate 270 is secured in threaded openings 272 in the support frame 2 using headed threaded bolts 274 and lock washers 276. A slidable plate 278 is mounted for sliding movement over the base plate 270. The movement of the slidable plate 278 is guided by using a pair of spaced apart slots 280 in the slidable plate 278 and threaded headed bolts and washers 282 in threaded openings (not shown) in the base plate 270. Force applying means 284, mounted on the base plate 270 and connected to the slidable plate 278, are used to move the slidable plate 278 in the directions indicated by the arrow 286. A support block 288 is rotatably mounted on the slidable plate 278. The support block 288 has a base portion 290 having a plurality of arcuately shaped slots 292 formed therein. Threaded headed bolts and washers 294 cooperate with the arcuately shaped slots 292 to permit rotation of the base portion 290 and the locking of the base portion 290 at the desired location. A block portion 296 is integral with the base portion 290 and has an access opening 298 extending therethrough and another opening 300 in communication with the access opening 298 for providing space for the mounting of apparatus (not shown), such as thermocouples. Another opening 302 is provided in the block portion 296 for providing a passageway for electric conducting means 304 for providing electric energy to the heating elements 234. A pair of spaced apart internally threaded openings 306 are provided so that headed externally threaded bolts 308 may be passed through the countersunk bores 264 and be threaded into the internally threaded openings 306 to secure the arcuately shaped support 222 on the block portion 296.

In operation, the arcuately shaped support 222 is adjusted so that a portion of a can body 6 contacts the arcuate surface 252 as the turret 16 rotates. The heating elements are then actuated to heat the arcuately shaped support 222 which heat is transferred to the arcuately shaped wick 250. A semi-solid or gel type lubricating material is pumped through the tubes 260. As the semi-solid or gel type lubricating material passes through the passageway 262, it is heated and changed into a liquid form so that it can saturate the arcuately shaped wick 250. If a liquid lubricating material is fed to the arcuately shaped wick 250, the heat will maintain it in the liquid form. The rest of the apparatus functions as described above in relation to FIGS. 1-5.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. Apparatus for applying a coating of material on at least a portion of the outer peripheral surface of a can body comprising:
   a fixedly mounted support frame;
   feeding means for continuously feeding can bodies to a feed station, each of said can bodies having a bottom end and an integral sidewall having a generally cylindrical outer peripheral surface;
   a main drive shaft which is mounted for rotation on said support frame;
   drive means for rotating said main shaft around an axis of rotation;
   a turret mounted on said main drive shaft for rotation therewith;
   a plurality of pockets formed on said turret between radially outwardly projecting members for rotation therewith and wherein each of said pockets removes a can body from said feed station as said pocket moves through said feed station;
   can body holding means in each of said pockets for holding each of said can bodies in each of said pockets so that at least a portion of said outer peripheral surface is freely exposed;
   can body rotating means for rotating each of said can bodies in said pockets as said turret rotates; and
   coating material applying means mounted on said support frame and positioned so that said at least a portion of said outer peripheral surface of said rotating can body contacts said coating material applying means as said turret rotates for applying a coating of material thereon.

2. Apparatus in claim 1 wherein said coating material applying means comprises:
   an arcuate support adjustably mounted on said support frame;
   an arcuate wick saturated with coating material mounted on said arcuate support and positioned to be contacted by said at least a portion of said outer peripheral surface of said rotating can body; and
   feeding means for feeding a supply of coating material to said arcuate wick.

3. Apparatus as in claim 2 wherein:
   said rotating can body has a peripheral velocity due to the rotation thereof around its own axis which is substantially the same as its peripheral velocity due to said rotation of said turret about its own axis and is rotating in a direction opposite to the direction of rotation of said turret about its own axis so that there is substantially no relative sliding movement between said at least a portion of said outer peripheral surface and said arcuate wick during their contacting relationship.

4. Apparatus as in claim 1 wherein said can body rotating means comprises:
   each of said pockets having a pair of rolls mounted on said turret for rotation relative thereto and having axes of rotation that are in parallel relationship;
   each of said rolls having a generally cylindrical outer peripheral surface with oppositely facing portions thereof spaced apart;
   a remaining portion of said side wall of said can body in each of said turrets having line contact with each of said outer peripheral surfaces of said pair of rolls; and
   roll rotating means for rotating said pair of rolls to rotate a can body in said pocket.

5. Apparatus as in claim 4 wherein roll rotating means comprises:
   a stationary gear; and
   a gear fixedly mounted on each of said rolls and located so as to be in mesh with said stationary gear so that rotation of said turret rotates said rolls.

6. Apparatus for applying a coating of material on at least a portion of the outer peripheral surface of a can body comprising:
   a fixedly mounted support frame;
   feeding means for continuously feeding can bodies to a feed station, each of said can bodies having a bottom end and an integral sidewall having a generally cylindrical peripheral surface;
   a main drive shaft mounted for rotation on said support frame;
   drive means for rotating said main drive shaft around an axis of rotation;

a turret mounted on said main drive shaft for rotation therewith;

a plurality of pockets formed on said turret between radially outwardly projecting members for rotation therewith and wherein each of said pockets removes a can body from said feed station as said pocket moves through said feed station;

can body holding means for holding each of said can bodies in each of said pockets so that at least a portion of said cylindrical peripheral surface is freely exposed;

can body rotating means for rotating each of said can bodies in said pockets as said turret rotates;

coating material applying means mounted on said support frame and positioned so that said at least a portion of said outer peripheral surface of said rotating can body contacts said coating material applying means as said turret rotates for applying a coating of material thereon;

feeding means for feeding said coating material to said coating applying means; and said coating material applying means having heating means for heating said coating material.

7. Apparatus as in claim 6 wherein:
said coating material in said feeding means is a semi-solid lubricant and is changed into liquid form by said heating means.

8. Apparatus as in claim 6 wherein:
said coating material in said feeding means is a gel lubricant and is changed into liquid form by said heating means.

9. Apparatus as in claim 6 wherein said coating material applying means comprises:
an arcuate support;
adjustable mounting means for adjustably mounting said arcuate support on said support frame; and
an arcuate wick mounted on said arcuate support and positioned to be contacted by said at least a portion of said outer peripheral surface of said can body.

10. Apparatus as in claim 9 wherein said heating means comprise:
at least one arcuate recess formed in said arcuate support;
at least one heating element located in said at least one arcuate recess; and
holding means for holding said at least one heating element in said at least one arcuate recess.

11. Apparatus as in claim 9 wherein said heating means comprise:
at least one arcuate recess formed in said arcuate support;
a plurality of heating elements located in said arcuate recess; and
holding means for holding each of said plurality of heating elements in said arcuate recess.

12. Apparatus as in claim 11 wherein said arcuate recess includes:
a radially outer surface and a radially inner surface; and
said plurality of heating elements comprises at least one heating element in contact with said radially outer surface and at least one other heating element in contact with said radially inner surface.

13. Apparatus as in claim 9 wherein said turret comprises:
an axially outer annular member fixedly mounted on said main drive shaft for rotation therewith;

said axially outer annular member having a generally cylindrical outer peripheral surface and a plurality of spaced apart openings extending therethrough in an axial direction and located radially inwardly from said generally cylindrical outer peripheral surface;

a main body portion having a central opening through which said main drive shaft passes;

a plurality of spaced apart compartments extending radially inwardly from the outer peripheral surface of said main body portion;

said main body portion having a diameter that is less than the diameter of said axially outer annular member;

an axially inner annular member having a central opening through which said main drive shaft passes;

said axially inner annular member having a generally cylindrical outer peripheral surface and a plurality of spaced apart openings extending therethrough in an axial direction and located radially inwardly from said generally cylindrical outer peripheral surface thereof;

said axially inner annular member having a diameter which is substantially the same as the diameter of said axially outer annular member;

said main body portion being located between said axially inner and outer annular members;

mounting means for mounting said main body portion and said axially inner annular member on said axially outer annular member so that said openings in said axially inner and outer annular members are in alignment;

each of said pockets having a pair of rolls mounted on said turret for rotation relative thereto and having axes of rotation that are in parallel relationship;

each of said rolls having a generally cylindrical outer peripheral surface with oppositely facing portions thereof spaced apart;

a remaining portion of said side wall of said can body in each of said pockets having line contact with each of said outer peripheral surfaces of said pair of rolls;

roll rotating means for rotating said pair of rolls to rotate a can body in said pocket; and vacuum means for supplying a vacuum between said oppositely facing portions of said pair of rolls to hold said can body onto said outer peripheral surfaces of said pair of rolls.

14. Apparatus as in claim 13 wherein said vacuum means comprises:
an annular wear strip secured to an axially inner surface of said axially inner annular member;
a vacuum manifold resiliently mounted on said support frame and having an arcuately shaped open portion thereof facing and aligned with said annular wear strip;
vacuum forming means connected to said vacuum manifold; and
aligned openings in said annular wear strip, said axially inner member and said compartments so that each of said compartments is in fluid communication with said arcuate vacuum manifold as it passes by said arcuately shaped open portion.

15. Apparatus as in claim 9 wherein said adjustable mounting means comprises:

rotational movement permitting means for permitting rotation of said arcuate support about an axis parallel to said axis of rotation of said main shaft; and linear movement permitting means for permitting linear movement of said arcuate support in linear directions toward or away from said turret.

16. Apparatus as in claim 15 wherein said heating means comprises:

at least one arcuate recess formed in said arcuate support;

at least one heating element located in said at least one arcuate recess; and holding means for holding said at least one heating element in said at least one arcuate recess.

17. Apparatus as in claim 15 wherein said heating means comprises:

at leas one arcuate recess formed in said arcuate support;

a plurality of heating elements located in said arcuate recess; and holding means for holding each of said plurality of heating elements in said arcuate recess.

18. A method for applying a coating on at least a portion of the outer peripheral surface of a can body comprising:

mounting a turret for rotation about a relatively fixed axis;

forming a plurality of pockets on the outer peripheral surface of said turret;

feeding a can body having a generally cylindrical outer peripheral surface into each of said pockets as said turret is rotating;

holding each of said can bodies in one of said pockets by applying a force thereto using holding means within each of said pockets so that at least a portion of said outer peripheral surface is freely exposed;

rotating said can body about its own axis as it is being held in said pocket;

moving said at least a portion of said outer peripheral surface of said can body into contact with a coating applying means so as to apply a coating thereon; and applying heat to said coating applying means.

19. A method as in claim 18 and further comprising:

rotating said can body about its own axis so that said outer peripheral surface has a peripheral velocity which is substantially the same as the peripheral velocity of said turret as it is rotated about its own axis and is rotating in a direction opposite to the direction of rotation of said turret about its own axis so that there is substantially no relative sliding movement between said at least a portion of said outer peripheral surface and said arcuate wick during the application of said coating.

20. A method as in claim 19 wherein said holding and rotating of said can body comprises:

urging said can body against the outer peripheral surfaces of a pair of rotating rolls having axes of rotation that are in parallel relationship and with opposite facing portions thereof spaced apart to form a space therebetween and so that only line contact exists between said can body and said pair of rotating rolls using said holding means, wherein said holding means comprises vacuum means acting on said can body through said space between said opposite facing portions.

* * * * *